Sept. 22, 1959 A. TRESKINSKY 2,905,765

AUTOMATIC SWITCH METHOD AND SYSTEM FOR TELEPHONES

Filed Aug. 17, 1955 3 Sheets-Sheet 1

INVENTOR
ALEXIUS TRESKINSKY
BY
Cornelius Zabriskie
ATTORNEY

AUTOMATIC SWITCH METHOD AND SYSTEM FOR TELEPHONES

Filed Aug. 17, 1955 3 Sheets-Sheet 2

INVENTOR
ALEXIUS TRESKINSKY
BY Cornelius Zabriskie
ATTORNEY

Sept. 22, 1959 A. TRESKINSKY 2,905,765

AUTOMATIC SWITCH METHOD AND SYSTEM FOR TELEPHONES

Filed Aug. 17, 1955 3 Sheets-Sheet 3

INVENTOR
ALEXIUS TRESKINSKY
BY Cornelius Zabriskie
ATTORNEY

United States Patent Office 2,905,765

Patented Sept. 22, 1959

2,905,765

AUTOMATIC SWITCH METHOD AND SYSTEM FOR TELEPHONES

Alexius Treskinsky, Teheran, Iran

Application August 17, 1955, Serial No. 528,911

31 Claims. (Cl. 179—18)

The present invention relates to switching fields, and more particularly to switching fields for telephone exchanges or the like.

It is an object of the present invention to provide novel elements for establishing a connection in the switching field of a telephone exchange or the like.

It is another object of the present invention to provide simplified circuits for the elements referred to hereinabove.

Other objects and advantages of the present invention will become apparent from the following detailed description thereof in connection with the accompanying drawings showing, by way of example, some preferred embodiments of the present invention. In the drawings—

Figures 2, 5, 5A:
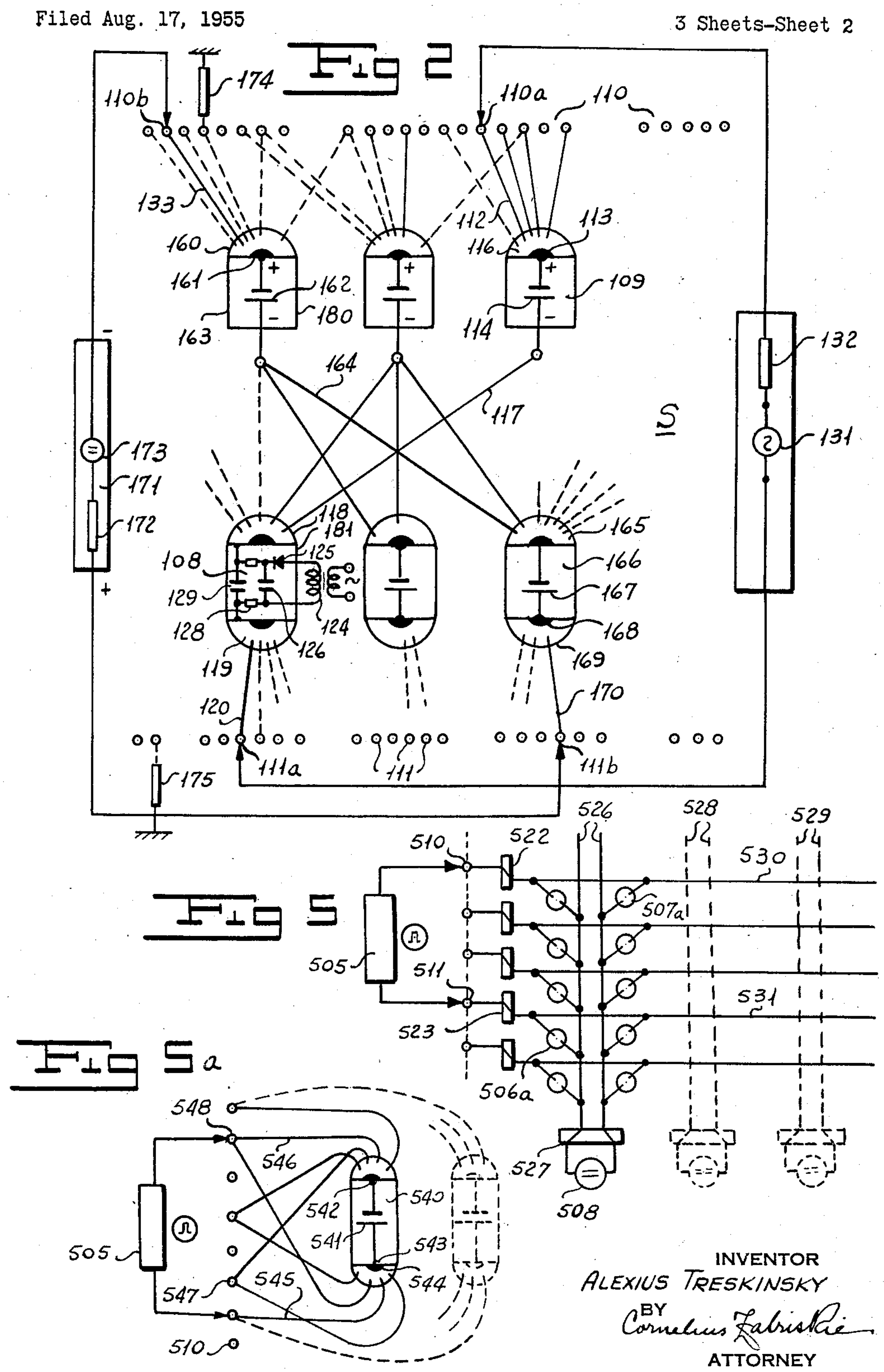
Fig. 2 is a wiring diagram of a second embodiment of the present invention.
Fig. 5 is a wiring diagram of part of an arrangement according to the present invention comprising cross bar switches.
Figure 6:
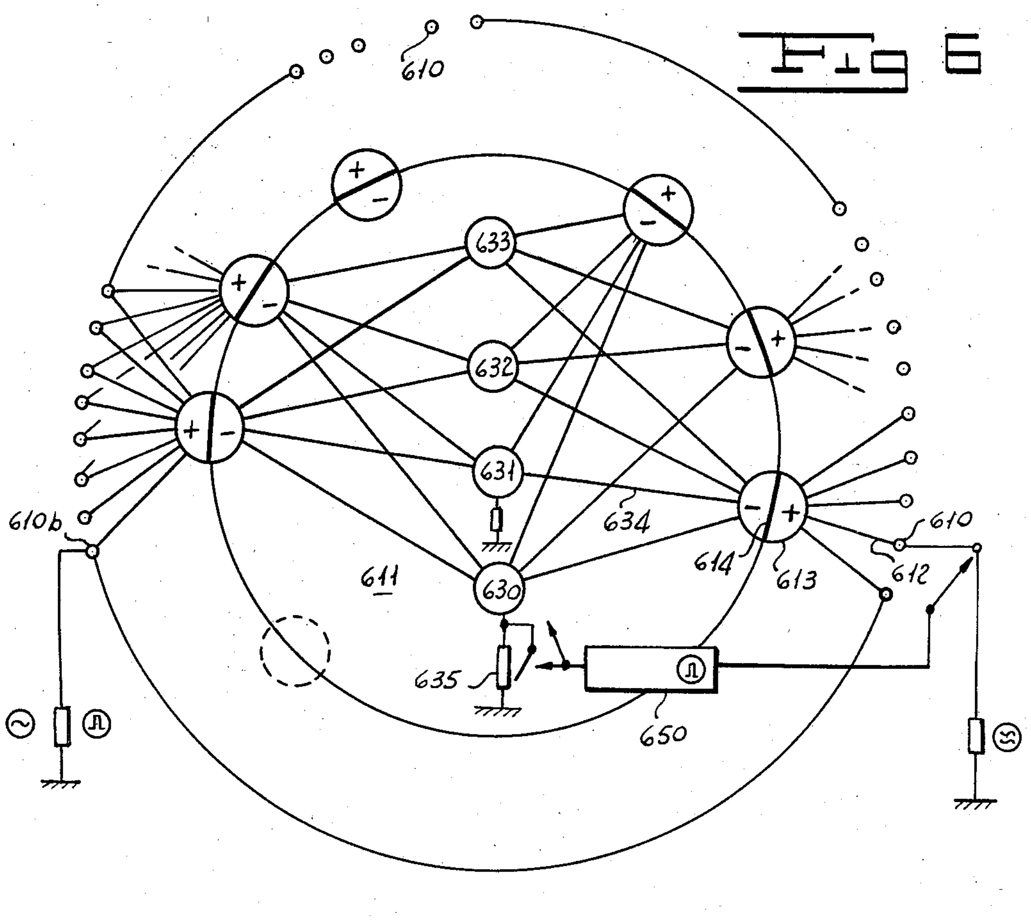

Fig. 5*a* shows a further embodiment according to the present invention;

Fig. 6 is a wiring diagram of another embodiment of the present invention; and

Figure 7:
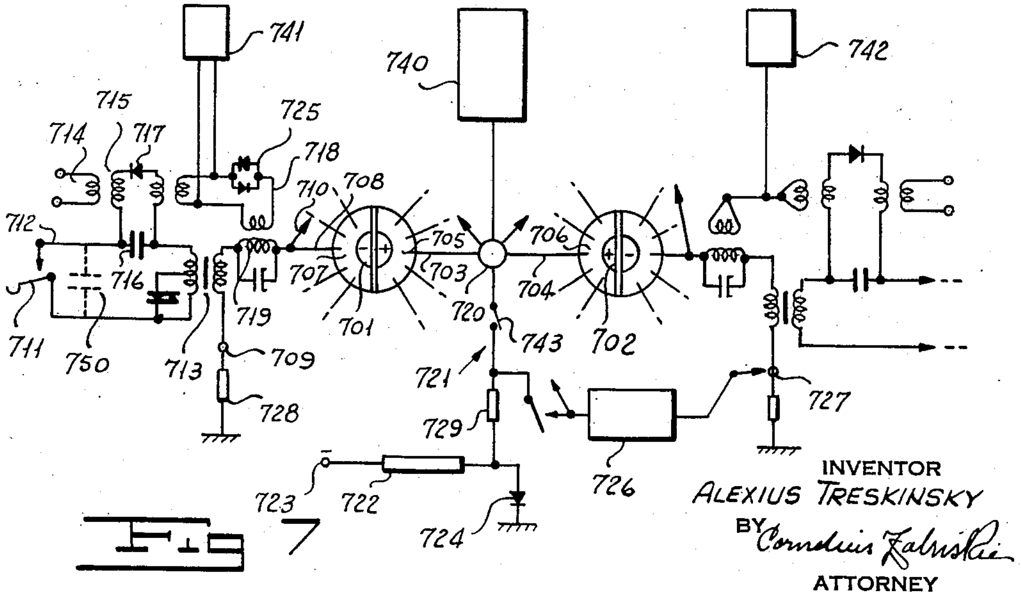

Fig. 7 is a wiring diagram of a further embodiment of the present invention.

Figure 1:
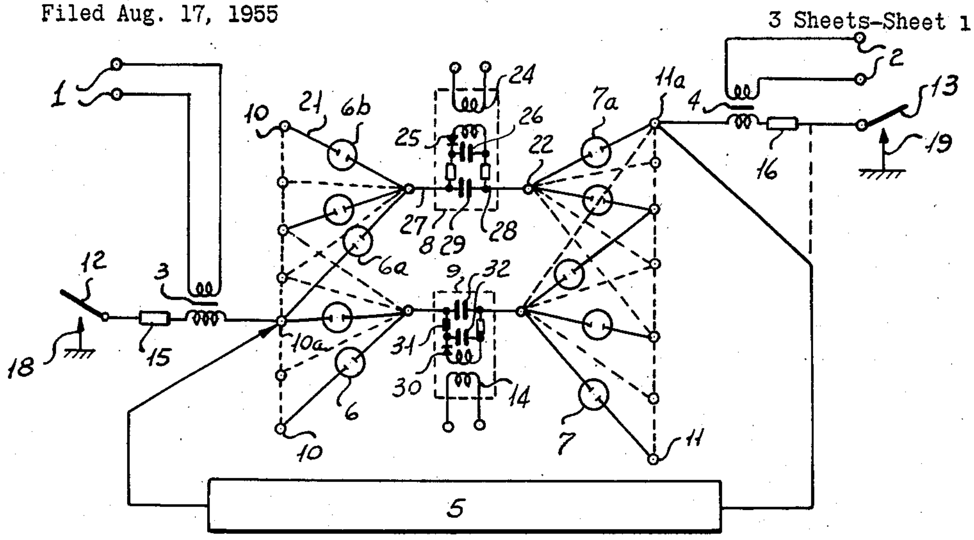
Fig. 1 is a wiring diagram showing a first embodiment of the present invention.

Referring now to the drawings and first to Fig. 1, the switching field comprises a plurality of first terminals 10 and a plurality of second terminals 11. The first terminals 10 are connected with the secondary winding of a transformer 3 the primary winding of which is connected to the terminals 1 of a first party. The secondary of the transformer 3 is connected in series with an impedance 15 connected in series with a contact 12 actuated by the handset (not shown) of the first party and cooperating with a grounded contact 18 when the handset of the first party is removed from its holder (not shown).

The second terminals 11 are similarly connected to the secondary of a transformer 4 having a primary connected to the terminals 2 of a second party. The secondary of the transformer 4 is connected in series with an impedance 16 which in turn is connected with a contact 13 being normally open but making contact with a grounded countercontact 19 when the second party or subscriber takes up its handset (not shown).

The first terminals 10 are connected with a third terminal 20 by communication paths 21 forming part of a conductive loop and including each a gas filled gap 6 separating in non-conductive condition the first terminals 10 from the third terminal 20. The communication paths 21 are termed hereinafter the tentacles and each tentacle 21 is provided with one gas filled gap such as 6. On the side of the second party or subscriber 2 the second terminals 11 are connected with a fourth terminal 22 by conductors 23 each having a gas filled gap such as 7*a* which is non-conductive in the normal condition thereof.

The third and fourth terminals 20, 22 are connected by a connection 27 including an element 8 including a source of electric power such as a transformer 24 the secondary of which is connected through a rectifier 25 with a condenser 26 the plates of which are connected by resistors such as 28 with the plates of another condenser 29 the plates of which are connected, respectively, with the third and fourth terminals 20, 22.

A register-marker 5 may be connected between one terminal 10*a* of the first terminals 10 and one terminal 11*a* of the second terminals 11. The register-marker 5 establishes in a manner known per se in the art the conditions for a later direct connection across the switching field and is disconnected after a connection between the subscribers 1 and 2 has been established.

Fig. 1 shows a second element 9 which includes a feeding transformer 14 the secondary of which feeds a rectifier 30 connected with impedances such as resistors 31 and/or condensers 32.

The gas filled gaps 6, 7 are voltage responsive devices which are enclosed by envelopes such as 6*b*. The gas filled gaps 6 and 7 are normally non-conductive and become conductive whenever a predetermined potential difference amounting for instance to 170 volts is applied to the gap. Once a gap has become conductive it stays so as along as the potential difference applied to the same is above a second predetermined value, for instance, 70 volts.

The operation of this device is as follows:

In the rest position the handsets (not shown) of all subscribers or parties including the parties with the terminals 1 and 2 are in non-operative position and the contacts 12, 13 are removed from the grounded contacts 18, 19 so that no current can flow in the circuits containing the transformers 3 and 4. When the first party or subscriber wishes to make a call he removes his handset and in consequence thereof the contacts 12 and 18 make contact with each other so that a connection is established from ground, contact 18, contact 12, impedance 15, secondary of transformer 3, one of the contacts of the first terminal 10, for instance the terminal 10*a* and one of the communication paths 25 being interrupted by the gas filled gap 6*a* connected therewith. The triggering loop circuit 5 produces in a manner known per se in the art a triggering voltage which is applied to the terminal 10*a* of the first terminals 10 and the terminal 11*a* of the second terminals 11.

It should be understood that the gas filled gaps 6 and 7 may be replaced by electrostatic relays (not shown) having electrodes (not shown) attracted towards each other by electrostatic forces against the force of a return spring (not shown), or the gaps may be replaced by cells (not shown) providing electronic barriers breaking down at predetermined voltage differences and returning to the non-conductive condition when the current thereto is interrupted. If desired, the voltage responsive devices may be formed by electron tube circuits (not shown) or thyratron circuits (not shown).

The triggering device 5 establishes a voltage difference between the terminals 10*a* and 11*a* which is sufficient to overcome the barriers set up by the voltage responsive devices such as the gas discharge gaps 6*a* and 7*a* and the element 8 so that all these parts are rendered conductive.

In this connection it should be noted that the element 8 comprises an insulated current source (transformer 24)

being devoid of any current connection to the common ground or any other element. The element 8 and the parts forming the same take the place of the cord circuits known per se in the art. If desired, the transformer 24 may be replaced by a direct current source such as a battery shown, for instance, in Figs. 2, 3, 4, 7 more fully to be described hereinafter. It should be noted these direct current sources are disconnected from ground. Furthermore, in the event that each element includes a direct current source one terminal thereof, for instance, the positive one will be applied to the first gas filled gaps 6 whereas the negative potential of the direct current source of the element 8 will be applied to the other gas filled gaps 7 connected to the second terminals 11.

It should be noted that only one pair of gas filled gaps such as the gaps 6*a* and 7*a* are rendered conductive because for some reason their sparking voltage is lower than that of the others or because the source 24 of the element 8 has a somewhat higher voltage than the other elements such as 9. In any case after the two gaps 6*a* and 7*a* have been rendered conductive their discharge current increases up to a certain limit until the voltage drop within the element 8 limits the remaining voltage to about 70 volts per gap.

When the conductive path between the terminals 10*a* and 11*a* has been established through the gas filled gap 6*a*, the element 8, and the gas filled gap 7*a*, the triggering device 5 may be withdrawn and the obtained connecting circuit can hold itself by the closed contacts 12, 18, 13, 19. The contact 13 has been brought into the closing position thereof when the second or called party shown by the terminals 2 has removed the handset (not shown) thereof.

It should be noted that this specific loop from ground to terminal 10*a*, the element 8, the terminal 11*a*, and back to ground may be energized by a sufficient pulse or a permanent voltage applied between the terminals 10*a* and 11*a*. Even in case that the contacts 12 and 13 be permanently closed, because the impedances 15 and 16 cause a sufficient voltage drop against ground.

After a connecting circuit has thus been established the voltage across the element 8 drops to its lower limit of about 2 times 70 volts and the element 8 becomes automatically tied to the established circuit so that no other call may be taken on by the element 8. The initial voltage for rendering conductive any of the other gaps 6 or 7 amounts to about 140 volts. In consequence thereof any later call will be automatically directed to another element such as 9 which is still in idle condition.

If a call coming from the terminal 10*a* is not directed to the terminal 11*a* but to any one of the remaining terminals 11 the initiating and triggering device 5 may be applied between the special terminal 10*a* and the general ground of the system if all contacts 13 related to the terminals 11 are closed so that the terminals 11 are on the same ground potential and thus equally susceptible to being called from the terminal 10*a*.

Thus it is seen that all terminals 11 are liable to being contacted but only one of them is actually called and this specific terminal 11*a* will be the terminal connected through a path offering the least resistance against being rendered conductive. It should be understood that the gas gaps 6*a* and 7*a* are those becoming conductive at the lowest potential difference, the voltage source feeding the element 8 delivering the highest voltage. Once a path having the lowest resistance against triggering is occupied, the next call would be directed over another path having among the remaining free paths the least resistance against being rendered conductive.

The difference of the threshold voltage igniting the gaps 6*a* and 7*a* and of the voltages of the feeding sources may be as small as 1/10 of a percent; however, always the path showing the smallest resistance will be ignited first and all other paths will be neglected against the path being rendered conductive.

The impedances 15 and 16 are formed preferably by inductors and should have a sufficient value so that when the same are included in series with the terminals 10*a* and 11*a*, the danger of rendering conductive a path over any of the other terminals 10 and 11 is reduced. Obviously such impedances as 15 and 16 have a mutual locking-out action owing to the negative character of the resistance of a conductive gas gap. The first gas gap which is rendered conductive will develop a higher current than all the other gaps which might be accidentally rendered conductive so that the gas gaps 6*a* and 7*a* render inoperative the other gas gaps owing to a counter voltage developed in the impedances 15, 16. This phenomenon is more fully described on pages 443–468, and particularly on page 462 of the Bell System Technical Journal, May 1952, in an article by W. A. Malthaner and Earle Vaughan on "An Experimental Electrically Controlled Automatic Switching System."

The essential operation of the elements mentioned hereinabove which replace the cord circuits used in connections known in the art may be carried out so that they have automatically selecting properties, automatic mutual excluding properties, automatic locking properties, and/or self-maintaining characteristics which were obtained hitherto by means of interlocking relay circuits.

The register-marker 5 known per se in the art forms an initiating device which establishes the conditions for a later direct connection across the switching field. When an individual connection across the switching field has been established the register-marker 5 may be disconnected and used for similar operations in connection with other terminals.

In the simplest case the register-marker 5 is formed by a connecting cord (not shown) provided with two terminal plugs (not shown) such as they are generally used in manual exchanges. The triggering device 5 includes a voltage source (not shown) which overcomes the igniting threshold of the gas gap circuits or the mechanical reluctance of the involved electrostatic relays (not shown). In automatic exchanges the register-marker is responsive to the received dialing pulses and reaches and marks the terminal of the called subscriber or party in a similar way as it is done by an operator using his connecting cord. Such register-markers are well known in many embodiments so that no further detailed description thereof will be needed. It should be noted, however, that the register-markers 5 forms a closed loop which singles out specifically selected ones of terminals such as 10*a* and 11*a* which have to be interconnected.

It should be understood that no special device such as the register-marker 5 is needed in case no specific terminal is called. If a connection has to be established between the terminal 10*a* and any one of the terminals 11 each of which is on ground potential a triggering voltage or pulse produced in the subscribers' terminal circuit formed by the impedance 15, the secondary of the transformer 3, and the terminal 10*a* will be sufficient to render conductive a connection across the switching field.

Referring now to Fig. 2 of the drawings, the shown arrangement corresponds to a three-stage selecting system of a normal telephone exchange. The first terminals 110 are to be connected across the switching field S with second terminals 111. One of the first terminals 110 is connected by a conductor 112 with a gas filled gap 116, the other electrode 113 of which is connected with an element 109 including a direct-current source 114 having a positive terminal connected to the electrode 113 and a negative terminal connected to a conductor 117 leading to the gas discharge gap 118 connected with an element 108 connected with a gas filled gap 119 connected by a conductor 120 with one of the terminals 111. The element 108 is provided with a source of electric power shown as a transformer 124 connected through a rectifier 125 with a condenser 126 which in turn is connected through resistors such as 128 with the plates of another condenser 129, the operation of these elements corresponding to the elements 24, 26, 28 shown in Fig. 1. Between the terminals 110*a* and 111*a* connected through the switching field S a temporary connection is established by a register-marker 130 comprising a source 131 of alternating current and a resistor 132.

The terminal 110*b* is connected by a conductor 133 with the gas filled gap 160 having an electrode 161 connected with the positive terminal of a battery 162 forming part of the element 163. The negative terminal of the battery 162 is connected by a conductor 164 with a gas filled gap 165 which in turn is connected to an element 166 comprising a battery 167 which is connected to one electrode 168 of a gas filled gap 169 connected by a conductor 170 with the terminal 111*b* of the second terminals 111. The terminal 111*b* is connected through a register-marker 171 including a resistor 172 and a source 173 of direct current connected in series thereto with the terminal 110*b*.

The terminals 110 are connected by an impedance 174 and contacts (not shown) to ground whereas the terminals 111 are connected by an impedance 175 and contacts (not shown) to ground. It should be understood that the impedance 174 corresponds to the impedance 15 shown in Fig. 1 whereas the impedance 175 corresponds to the impedance 16 shown in Fig. 1; also, the connections between the impedances 174 and 175 with the terminals 110 and 111 contain transformer secondaries (not shown) forming part of transformers (not shown) by which the terminals (not shown) of the calling and called subscribers or parties are connected with the terminals 110, 111.

The operation of the device shown in Fig. 2 is substantially the same as that of the device shown in Fig. 1 except that various connections may be made simultaneously between the first terminals 110 and the second terminals 111.

In U.S. patent No. 1,545,025 to Anspach a switching field is described using selective outside loops. The present invention has the advantage over the arrangements disclosed in the Anspach patent No. 1,545,025, in that the elements constitute perfectly insulated devices which are even disconnected in idle condition from ground and other elements.

Furthermore, in this connection reference is made to an article entitled "Cold Cathode Gas-Filled Tubes as Circuit Elements in Automatic Telephony," by W. Six in Communication News of January 1954, volume 14, No. 2, pages 58–96. In this article a system is described using cold cathode trigger gas tubes which are rendered conductive by pulses applied to special trigger electrodes. This system, however, does not allow for an instantaneous switching through of a series of stages and it uses a plurality of additional elements such as resistors, capacitors, thermistors, associated with each individual gap thus rendering the number of elements exceedingly higher. In contradistinction thereto, the present invention, leads to a great simplification of all these elements, which are mostly simple gas gaps accommodated in common vessels 180 and 181 and surrounding a much smaller number of individual current sources such as 162 and 114.

The feeding sources such as the transformers 24 and 14 shown in Fig. 1 or the transformer 124 shown in Fig. 2 have to be efficiently insulated and screened in order to avoid any interaction between the elements and the speech circuits. The cross talk caused by the static capacitances of the gaps has been found to be negligible.

For the reduction of the dimensions, the stray capacitances, and the costs of feeding, preferably the alternating current to the elements and the subscriber's circuits should be an inaudible high frequency current so as to allow for a reduction of the sizes of all elements.

When the gas gaps related to one of the elements are ignited, the internal impedance of the current source of the said element has to be as high as needed in order to stabilize the discharge at a point of its current-voltage characteristic where the slope is almost horizontal or even negative in order to minimize the speech level losses.

For avoiding double occupation of the terminal circuits of a subscriber or a trunk, or the simultaneous ignition of two connecting paths, the terminal circuits should include an impedance having an angle of lag causing the voltage drop along said impedance by the direct current flowing through the conductive gas to reach about 20 to 30 volts in the gap loop circuit.

Trigger pulses or voltages applied to the terminals for producing a conductive circuit should have a magnitude of about 30 to 50 volts for a gas gap circuit comprising two stages. If necessary, much higher trigger voltages are limited by means of diode rectifier limiters known in the art. High frequency trigger voltages may be somewhat lower owing to an easier penetration and excitation of gases by high frequency fields.

Figure 4:
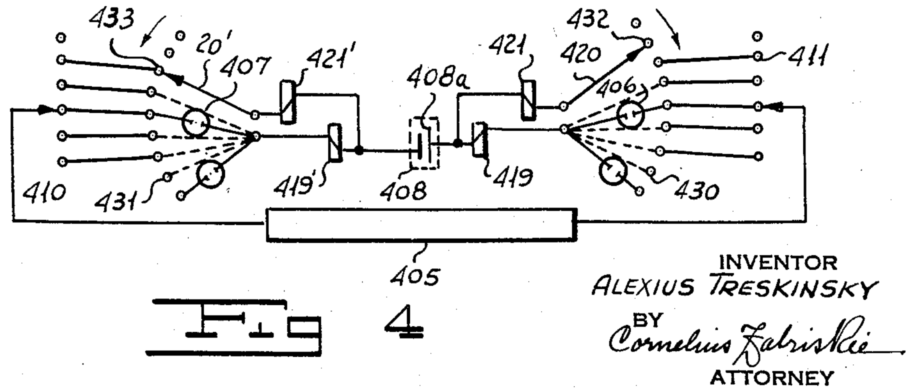
Fig. 4 is a wiring diagram of a circuit according to the present invention, this circuit being provided with rotary switches making contact with stationary contacts arranged in an arc of a circle.

In the above description it has been tacitly understood that the described gas discharge circuits serve at the same time as carrier circuits for the speech or signal currents which are superposed to the direct currents of the gas discharge. However, the present invention is not limited exclusively to such circuits. The method of easily and automatically finding and occupying a connecting path across the switching field or a section thereof may be applied to the directing and controlling of all kinds of switching devices such as relays, crossbar switches, or rotary selectors as shown in Figs. 2, 4, and 5 of the drawings.

Figure 3:
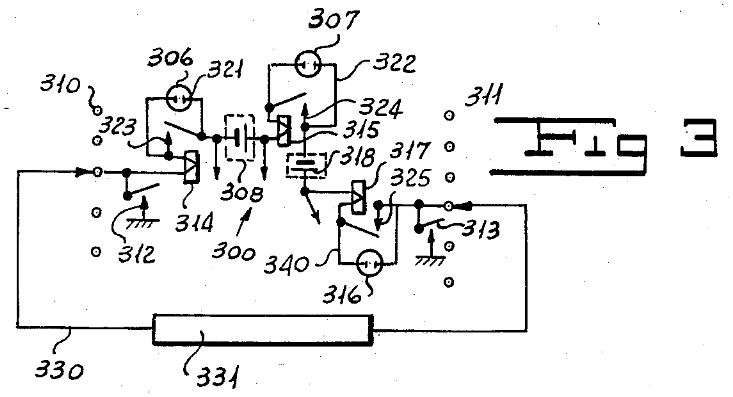
Fig. 3 is a wiring diagram of a third embodiment of the present invention.

Referring now to Fig. 3 of the drawings, the terminals 310 of the calling subscriber are connected with the terminals 311 of the called subscriber by a circuit comprising two elements 308 and 318. Each of said elements is connected to connections 321, 322 and 340 provided with gas-filled gaps 306, 307 and 316. It should be understood that the principles of the connection shown in Fig. 1 are embodied in Figs. 3, 4 and 5 such as finding one direct path out of a multitude of such paths, said one direct path being exclusively maintained. However, the gas gap circuits serve only as controlling devices for putting into action electro-mechanical connectors having metallic contacts for putting through speech circuits over metallic conductors.

Fig. 3 shows a switching field generally denoted by 300 connecting the terminals 310 and 311 and having relays 314, 315 and 317 which are switched in by means of the gas-filled gaps 306, 307, and 316 connected in series with the actuating windings of said relays which may maintain themselves by their respective make contacts 323, 324 and 325 and the contacts 312 and 313 connected to ground. A trigger loop circuit 330 containing a register-marker 331 connects temporarily one of the first terminals 310 with one of the second terminals 311.

No speech circuits are shown in Fig. 3 since they are not needed for understanding the operation thereof. The contacts (not shown) closing the speech circuits (not shown) form part of the contact banks (not shown) of the relays 314, 315, 317.

The circuit shown in Fig. 3 may be released by interrupting the contacts 312 or 313 situated within the terminal circuit of the subscriber or party as shown hereinabove for the contacts 12 or 13 of Fig. 1. The contacts 312, 313 interrupt the circuit when the party is interrupting his line loop (not shown).

The arrangement shown in Fig. 3 is rather expensive because a relay is provided for each gas-filled gap. For this reason this circuit is only to be recommended in cases which do not employ a very large number of alternative connections.

Referring now to Fig. 4 of the drawings showing an arrangement with rotary selectors, an element 408 including a battery 408*a* is connected through relay windings 419, 419' with gas-filled gaps such as 406 and 407. In the embodiment shown in Fig. 4 the connection is put through two selecting stages having contact banks 430, 431. However, if desired, more stages could be connected in chains as shown in Fig. 2 and triggered by a common finding and trigger device 405.

The gas-filled gaps 406 and 407 are rendered conductive so that the selectors 420 and 420' start rotating under the action of the high impedance starting relays 419 and 419'. When the selector wipers 420 and 420' reach the marked contacts 432, 433 connected to the conductive gas gaps (not shown), the relays 421 and 421' stop the further rotation and a circuit between the terminals 410 and 411 is established.

Referring now to Fig. 5 of the drawings, the application of the same principle to the use of crossbar switches is shown. The element 508 is in a condition for feeding a pair of gas-filled gaps 506*a* and 507*a* connected to the two conductors 526 leading to the element 508. The gas-filled gaps 506*a* and 507*a* are rendered conductive when two terminals 510 and 511 associated with the relays 522 and 523 controlling the horizontal bars 530 and 531 are connected by the trigger loop device 505. When the gaps 506*a* and 507*a* are rendered conductive the magnets 522 and 523 are energized and carry out relatively fast movements whereas the magnet 527 controlling the vertical bridge wires 526 causes the same to move relatively slowly. The combined movements of the bars 526, 530, and 531 caused by the magnets 522, 523 and 527 establish a cross point connection well known in the art, the magnet being energized until the circuit is released whereas the magnets 522 and 523 release immediately after fulfilling the functions thereof.

Two further pairs of bridge wires 528 and 529 are shown in dotted lines in Fig. 5.

Referring now to Fig. 5*a*, a diagram is shown for proving that no difference in principle exists for producing connections by mechanical switches or only by gas-filled gaps. Whereas in Fig. 5 the element 508 connected to the gas-filled gaps 506*a* and 507*a* is used for directing and controlling crossbar switch in Fig. 5*a* a battery 541 arranged in an element 540 is connected to one electrode 542 or 543 of gas-filled gaps such as 544 which are connected by connections such as 545 and 546 with the terminals 547 and 548 of the terminal bank 510. The trigger loop device 505 connects the terminals 547 and 548 temporarily with each other so as to initiate discharge currents through the element 540 and the gas-filled gaps connected thereto. Furthermore Fig. 5*a* shows that the terminals 10 and 11 of Fig. 1 may be situated in one row 510 and the terminals thereof may be contacted eventually by the connections of tentacles 545 and 546 connected to the positive and negative terminals of one and the same element 540.

Referring now to Fig. 6 of the drawings, the terminals 610 are disposed in a circle surrounding the switching field 611 extending over a smaller circle around the inner part of the switching field. Each terminal such as 610*a* and 610*b* connected to a party or subscriber is connected by connections such as 612 with an element 613 shown as a circle subdivided by a diameter 614 into a positive half and a negative half. Within the switching field 611 a plurality of trunk terminals 630, 631, 632 and 633 are disposed which are connected by connections such as 634 with the negative parts of the elements 613. An incoming call received by the terminal 610*a* produces a trigger pulse or voltage which is transferred to one of the idle trunk terminals 630 to 633 in the same way as described hereinabove in connection with Fig. 1 when the contacts 13 thereof are closed so that the terminals 11 shown in Fig. 1 and being the analogs of the terminals 630 to 633 shown in Fig. 6 offer all the idle terminals to a call.

Be it assumed that the call is connected to the impedance 635 connected to the trunk terminal 630. A registering and connecting device 650 being the analog of the trigger device 5 shown in Fig. 1 hunts after the newly occupied trunk terminal, that is 630. After having found the same the device 650 emits an audible signal inviting the dialling. When the subscriber (not shown) connected to the trunk terminal 630 dials the number of the subscriber 610*a* the device 650 registers the pulses corresponding to the dialed number and translates the same in a manner well known in the art into movements of the device 650 so as to reach the called terminal 610*a* and to emit eventually trigger pulses for rendering the connecting path from the terminal 610*a* to the trunk terminal 630 conductive so that a connecting path across the switching field 611 is established.

Referring now to Fig. 7 of the drawings, only one connecting path between two parties or subscribers and one trunk terminal are shown and all other elements and trunk terminals are omitted. Two elements 701 and 702 are shown each having a positive part and a negative part. Connections 703 and 704 are separated by gas-filled gaps from the elements 701 and 702. These gas filled gaps cooperate with the positive halves of the elements 701 and 702 whereas the negative halves thereof cooperate with gas-filled gaps such as 707 connected to a conductor 708 leading to a terminal 709 over a tuned circuit 719 described more in detail hereinafter. The arrows such as 710 shown in the diagram are the conventional symbols for a plurality of connections radiating from the footpoint of the arrows.

The subscriber or party indicated by the switch hook 711 is through a line loop 712 connected with the conductor 708 through a transformer 713. If the line loop 712 is opened it is equivalent to a condenser 750 shown in dotted lines. It should be noted that the loop 712 is unconnected to ground because a ground connection is not needed in the circuit to be presently described in detail except for additional signalling and ringing purposes.

For feeding the microphone and providing signalling currents each subscriber is provided with a source 714 of alternating current which is connected by a transformer 715 with a secondary circuit comprising a condenser 716 forming part of the line loop 712 and a rectifier 717 connected in series thereto. The alternating current fed by the source 714 has preferably an inaudible frequency. The source 714 feeds current only when the subscriber's loop 712 is closed whereas in the open condition thereof shown in Fig. 7 the loop is fully charged and does not take up any current.

If the subscriber lifts his receiver handset (not shown) from the hook 711 the loop 712 is closed and causes a high frequency current to be fed through the rectifier 717 so that over a linking circuit 718 a tuned circuit 719 connected with the terminal 709 is energized. The tuned circuit 719 forms part of the conductor 708 and faces the switching field with its plurality of elements such as 701.

The tuned circuit 719 carries no load as long as no gap has been rendered conductive. Thus, it develops in a very short period of time a substantial voltage being sufficient for overcoming the threshold of the element 701 so that one of the idle trunk terminals 720 is seized with exclusion of all other trunk terminals offering themselves simultaneously.

The trunk terminal 720 is provided with an additional circuit 721 rendering the trunk terminal 720 more attractive to the element 701 when the trunk terminal 720 is idle and more repulsive to them when it is busy. When the trunk terminal 720 is idle it is imparted a potential over a resistor 722 having a high resistance value and being connected to the negative voltage source 723 and to the rectifier 724 connected in turn to ground. At the moment when the element 701 is rendered conductive, a relatively large direct current flows through the diode 724 which is non-conductive for the current supplied by the source 723. The direct current issued by the element 701 produces at the terminal 709 and the trunk terminal 720 voltages which repel any second contacting of the same by other elements (not shown). The substantial high frequency voltage developed in the tuned circuit 719 breaks down when a direct current loop is established over the element 701 owing to a loading of the tuned circuit 719.

The linking circuit 718 includes two rectifiers 725 forming a threshold which allow for a certain lack of insulation or leakage within the loop 712. The contacting of a trunk terminal 720 by a subscriber lifting his receiver exactly corresponds to the pre-selecting operation within a normal telephone exchange.

After the trunk terminal 720 is occupied the same attracts by its change of polarity or the high frequency applied to it, one of the idle register markers 726 which accepts the dialling pulse information and issues an inviting audible signal. When the subscriber is dialling he produces a high frequency current the interruptions of which influence the register marker 726 which registers the same and translate them into movements of the register marker 726 until the terminal 727 of the called subscriber is reached. If the terminal 727 is found to be unoccupied the register marker 726 emits a pulse applied between the trunk terminal 720 and the terminal 727 so as to make another connection with the already occupied trunk terminal 720.

The igniting loop of the register marker 726 does not include the repulsive voltages caused by the voltage drop along the impedance 728 connected in series with the terminal 709 of the subscriber 712 and the impedance 729 of the trunk terminal 720, respectively, so that an additional connection may be superposed to the already occupied terminal 709 if such an additional connection should be needed or advisable.

The register marker 726 contacting the terminal 727 ascertains its condition, whether free or engaged, and may overcome its engagement if the calling subscriber 712 is authorized to make the call. In any case, by connecting both elements 701 and 702 with the same trunk terminal 720 a direct circuit between the elements 701 and 702 is established. After the establishment of the circuit a signal and order transmitter 740 connected to the trunk terminal 720 emits an audible frequency or a high frequency signal for exciting a ringing and counting circuit such as 741 and 742 arranged within the terminal circuits of each subscriber. The signal and order transmitter 740 and the ringing and counting relay circuits 741 are known per se in the art and are not described more in detail. The ringing relay connected to the circuit 741 emits a ringing signal until the called subscriber's loop is closed as usual. A current flowing through the subscriber's loop prevents the emission of a ringing signal so that no ringing is produced in the calling subscriber's loop. Inversely the same signal may start the counting function at the subscriber's counter (not shown) only when it is previously rendered inoperative by a current flowing through the subscriber's loop.

When the call has been put through and both subscribers have finished their talk they place their respective receivers on the hooks such as 711 and thus interrupt the flow of high frequency current towards the trunk terminal 720. The signal and order transmitter 740 connected with the trunk terminal 720 detects the absence of high frequency current and interrupts for a short moment the contact 743 thus rendering the further flow of direct current through the elements 701 and 702 impossible since they are connected in opposition to each other. In consequence thereof the current through the elements 701 and 702 is interrupted, and the said elements return to their idle condition, offering themselves to further calls.

In completely electronic exchanges where no mechanical contacts should be used, the contact 743 may be replaced by a device (not shown) for producing positive pulses of sufficient strength and duration for extinguishing both elements 701 and 702.

The arrangement shown in Fig. 7 is practicable for an exchange with up to about 2,000 subscribers. If more subscribers are present a multi-stage arrangement such as that shown in Fig. 2 should be provided.

Any preferential subscribers having authority to overcome a call or the authority for making toll calls etc. may be fed by preferential high frequencies from their high frequency terminals 714. The register marker circuits may discern by simple tuned high frequency detectors (not shown) the kind of preferential treatment to be accorded to any subscriber, the number of distinct high frequencies which can be used being very large.

I have described hereinabove some embodiments of a telephone exchange according to my invention. However, I wish it to be understood that numerous changes, substitutions of equivalents, or the like may be made in the embodiments described hereinabove, my invention being defined by the appended claims.

I claim:

1. In a switching field for telephone exchanges and the like, in combination: a first plurality of terminals, a second plurality of terminals, a communication path between said first and second pluralities of terminals, an element connected in the course of said communication path, said element having an idle non-conductive condition and including a source of electric power and a transformer and a rectifier connected to said transformer and being insulated from the ground and from said first and second plurality of terminals when said element is in its idle non-conductive condition.

2. In a switching field as claimed in claim 1, a third terminal, a fourth terminal, said third and fourth terminals being connected with said communication path connected with said element, and a plurality of connections each including a voltage responsive device, said connections connecting, respectively, said first terminals with said third terminal, and said second terminals with said fourth terminal.

3. A switching field as claimed in claim 2, said voltage responsive devices being designed, respectively, as gas discharge gaps.

4. A switching field as claimed in claim 2, said voltage responsive devices being designed as electronic barriers becoming conductive at a predetermined potential difference so as to close electric circuits, said electronic barriers being rendered non-conductive whenever said electric circuits are interrupted.

5. A switching field as claimed in claim 2, and electronic tube circuits forming part of said voltage responsive devices and becoming conductive when a predetermined potential difference is applied to the ends of said connections, said electronic tube circuits becoming non-conductive upon interruption of the electric circuits containing the same.

6. A switching field as claimed in claim 1, and means for adding impedance to the internal impedance of said source of electric power.

7. A switching field as claimed in claim 6, said added impedance means including resistors.

8. A switching field as claimed in claim 6, said added impedance means including inductors.

9. A switching field as claimed in claim 6, said added impedance means including capacitors.

10. A switching field as claimed in claim 9, said capacitors being connected in shunt to said source of electric power.

11. In a switching field for telephone exchanges and the like, in combination: a first plurality of terminals, a second plurality of terminals, a source of electric power, an element having an idle condition, said source being insulated from ground and said first and second pluralities of terminals when said element is in idle condition, a conductive loop bridging said element from one terminal of said first plurality of terminals to one terminal of said second plurality of terminals, and a pair of gas filled gaps connected to said conductive loop, said element in said idle condition thereof developing a potential difference sufficient for said gas filled gaps to be rendered conductive.

12. A switching field as claimed in claim 11, and means for establishing a voltage across said conductive loop, said voltage triggering a discharge across said gas filled gaps.

13. A switching field as claimed in claim 12, and means for reducing the potentials of said terminals when said gas filled gaps are rendered conductive so as to prevent the formation of a discharge across the gas filled gaps connected in parallel to said conductive gas filled gap.

14. A switching field as claimed in claim 11, and a common envelope for a plurality of said gaps.

15. In a switching field for telephone exchanges and the like, in combination: a first plurality of terminals, a second plurality of terminals, a plurality of sources of electric power, a plurality of elements each having an idle condition, said sources of electric power being insulated from ground, other elements and said first and second pluralities of terminals when said elements are in idle condition, said elements being arranged in multiple stages, means for extending said stages over interlaced subsequent stages, and a plurality of pairs of gaps connected to said extending means, said elements in said idle condition thereof developing potential differences sufficient for said gas filled gaps to be rendered conductive by means of an additionl outside triggering voltage.

16. A switching field for telephone exchanges and the like, in combination: a first plurality of terminals, a second plurality of terminals, a source of electric power, an element having an idle condition, said source being insulated from ground, other elements and said first and second pluralities of terminals when said element is in idle condition, a conductive loop bridging said element from one terminal of said first plurality of terminals to one terminal of said second plurality of terminals, a pair of gas filled gaps connected to said conductive loops, said element in said idle condition thereof developing a potential difference sufficient for said gas filled gaps to stay conductive after triggering, means for discharging a direct current through said gas filled gaps in conductive condition, and means for superposing speech and signal channels to said direct current.

17. A switching field as claimed in claim 16, said superposing means including relay contacts.

18. A switching field as claimed in claim 16, said superposing means including selectors controlled by the currents flowing in said gas filled gaps in conductive condition.

19. A switching field as claimed in claim 16, said superposing means including crossbar switches controlled by the currents flowing in said gas filled gaps in conductive condition.

20. A switching field as claimed in claim 1, said element forming a chain being rendered conductive by a single triggering operation across the switching field.

21. A switching field as claimed in claim 1, said element forming a chain being rendered conductive by consecutive triggering operations across the switching field.

22. A switching field as claimed in claim 1, a plurality of circuits including impedances, said circuits being connected with said first and second pluralities of terminals, and means for producing a voltage drop along said impedances of said circuits so as to render said second plurality of terminals less attractive to said element by the action of the potential produced in said impedances by said voltage drop.

23. A switching field as claimed in claim 22, and a conductive circuit triggered by said source of electric power across said element.

24. A switching field as claimed in claim 22, and a trunk terminal connected with said element.

25. A switching field as claimed in claim 24, and a circuit including a resistor and a diode connected to said trunk terminal.

26. A switching field as claimed in claim 24, and a register marker, said register marker being adapted to find one terminal of said second plurality of terminals and to produce a trigger voltage connecting said one terminal of said second plurality of terminals with said trunk terminal.

27. A switching field as claimed in claim 1, said switching field forming part of an automatic telephone exchange, line loops forming part of said automatic telephone exchange, a plurality of high frequency sources, and parts separating said high frequency sources from said line loops.

28. A switching field as claimed in claim 27, said parts including a transformer and a rectifier.

29. A switching field as claimed in claim 27, the high frequency currents supplied by said high frequency sources being fed into said switching field and igniting the circuit of said element.

30. A switching field as claimed in claim 27, dialling means producing interrupted high-frequency currents, and a register-marker for detecting said interrupted high frequency currents produced by said dialling means.

31. A switching field as claimed in claim 27, and means for feeding to said line loops different high frequencies corresponding, respectively, to different subscribers so as to differentiate the same according to a system of priorities allotted to said subscribers.

References Cited in the file of this patent

UNITED STATES PATENTS

| | | |
|---|---|---|
| 1,545,025 | Anspach | July 7, 1925 |
| 2,684,405 | Bruce et al. | July 20, 1954 |
| 2,763,722 | Six et al. | Sept. 18, 1956 |
| 2,779,822 | Ketchledge | Jan. 29, 1957 |
| 2,780,674 | Six et al. | Feb. 5, 1957 |